United States Patent Office 3,677,779
Patented July 18, 1972

3,677,779
PROCESS FOR IMPROVING THE HYDRATION RESISTANCE OF DEAD-BURNED MAGNESIA
Vaughn V. Hughey, Tiffin, Ohio, assignor to Basic Incorporated
No Drawing. Continuation-in-part of application Ser. No. 749,275, Aug. 1, 1968. This application Feb. 16, 1971, Ser. No. 115,712
Int. Cl. C04b *35/04*
U.S. Cl. 106—58                                    8 Claims

ABSTRACT OF THE DISCLOSURE

A process of improving the hydration resistance of dead-burned magnesia refractory products in which such a dead-burned magnesia product is treated with a $B_2O_3$ containing compound. The magnesia is preferably heated to a temperature of at least approximately 300° F., and the $B_2O_3$ compound is preferably in the form of a solution or suspension heated to a temperature within the range of about 140 to about 212° F. The addition of $B_2O_3$ compound should be sufficient to add about 0.1 to about 1% by weight of $B_2O_3$ to the dead-burned magnesia.

---

This application is a continuation-in-part of application Ser. No. 749,275, filed Aug. 1, 1968, now abandoned.

This invention relates generally as indicated to a process of improving the hydration resistance of dead-burned magnesia and more particularly to such a process in which magnesia is treated with a $B_2O_3$ containing compound.

Refractory or dead-burned magnesia is a principal material used in the manufacture of refractory products, such as brick, bonding cements, ramming and casting mixes, etc. In one method of manufacturing such products, a mixture of granular magnesia and bonding agent is tempered with water prior to forming into brick, or prior to being rammed, gunned or shoveled into furnace linings, to lubricate and make the mixture plastic so that it can be placed more readily in the mold or against the furnace lining and also to produce a hydrated bond among the refractory grains. In the manufacture of chemically bonded brick, for example, the bonding agent, such as magnesium sulfate, sulfuric acid and/or ligno-sulfonate salts, is added to a dry refractory mix, followed by tempering with water. The tempered mix is then formed into bricks, which are usually cured for several hours in a humid atmosphere at temperatures of about 150 to 250° F. If the magnesia grains are susceptible to hydration, they tend to hydrate and expand which causes bursting and disintegration of the brick.

Magnesia refractory mortars, ramming, gunning and patching mixes are also normally blended in the dry state with a bonding agent, and the final mix is tempered with water just prior to placement in the furnace lining. In using such mixes, the tempering water may be as much as 5 to 10% of the weight of the dry mixture, and this water remains in contact with the magnesia grains during placement and final curing of the rammed, cast or gunned mass. Under such circumstances, the magnesia refractory grains are in contact with water for several hours, or even days, in the depths of the lining before the excess water is driven off as vapor by the heat which is released from the subsequent metallurgical operations. In the furnace, the temperature of the water may rise to its boiling point of 212° F. or higher. If the magnesia grains are thus susceptible to hydration, they may react with the water to form magnesium hydroxide, which, due to its much larger volume, will cause the mix to expand with consequent heaving and disintegration.

It is accordingly a principal object of the present invention to provide a process for improving the hydration resistance of magnesia refractory products.

It is a further object of this invention to provide a convenient process of improving the hydration resistance of magnesia refractories which requires a minimum of equipment, effort and time.

Other objects, features and advantages of this invention will become apparent to those skilled in the art from a reading of the following, more detailed description of the invention.

These and other objects are achieved by this invention in which a dead-burned magnesia refractory product is treated with a $B_2O_3$ containing compound preferably in the form of a solution or suspension to add approximately 0.1 to about 1% by weight $B_2O_3$ to the product. As will be seen from the more detailed description which follows, the hydration resistance of such magnesia refractories can be significantly increased.

The process of this invention is applicable to refractory magnesia products of various compositions, including those of high purity as for example approximately 95 or 97% MgO. It is also applicable to other dead-burned magnesia compositions including those of considerably lesser MgO content and also dicalcium-silicate bonded magnesia refractories. The application of the present invention to various magnesia refractories will be demonstrated in more detail by the working examples which follow.

There are various $B_2O_3$ containing compounds which are suitable for forming the treating solution used in this invention. Illustrative examples include orthoboric acid ($H_3BO_3$) and metaboric acid ($HBO_2$), borax ($Na_2B_4O_7 \cdot 10H_2O$), anhydrous borax, rasorite ($Na_2B_4O_7 \cdot 4H_2O$), anhydrous rasorite ($Na_2B_4O_7$), sodium metaborate $$(NaBO_2 \cdot 4H_2O)$$

colemanite ($HCa(BO_2)_3 \cdot 2H_2O$), ulexite ($NaCaB_5O_9 \cdot 8H_2O$), and ammonium and potassium borates. Of such compounds, anhydrous borax, anhydrous rasorite, rasorite, sodium metaborate and boric acid are preferred.

To express the boron additions to the dead-burned magnesia in a uniform manner, it is stated in terms of $B_2O_3$ since this is a common ground among the various suitable materials. The following table shows the stoichiometric $B_2O_3$ equivalents for 1% additions of the preferred boron compounds.

|  | Percent $B_2O_3$ |
|---|---|
| 1.0% $H_3BO_3$ | 0.56 |
| 1.0% $NaBO_2 \cdot 4H_2O$ | 0.25 |
| 1.0% anhydrous rasorite | 0.69 |
| 1.0% $Na_2B_4O_7$ (rasorite) | 0.69 |
| 1.0% anhydrous borax | 0.69 |

The addition of the boron compound to the dead-burned magnesia refractory product should be sufficient to add about 0.1% to about 1% by weight of $B_2O_3$ to the dead-burned magnesia, with the preferred range being about 0.15% to about 0.7%. Greater borate additions may be used in certain cases if desired to obtain hydration resistance, but such additions may adversely affect the refractoriness of the dead-burned magnesia.

Better results have been obtained in improving hydration resistance when the dead-burned refractory product is heated to a temperature of at least approximately 300° F. and preferably within the range of about 300 to 400° F. The $B_2O_3$ containing compound is preferably a water solution (or suspension of finely divided $B_2O_3$ containing compound in water) to facilitate application to the refractory product, but it may be applied as a finely divided solid if desired. The solution or suspension is also preferably heated to speed up dissolving the borates which are slow to dissolve and, in the case of some concentrated solutions such as a 10% $Na_2B_4O_7$ solution, to keep the compound insolution. For convenience, the temperature of the borate solution or suspension will be high enough to keep the specific compound in solution and will generally be within the range of about 140 to about 212° F., preferably at least about 175° F.

When the $B_2O_3$ containing solution is heated to within the above-indicated range, it clarifies which has been found to be beneficial to the present invention. Clarification of the solution could also, of course, be achieved by decanting or filtering.

The preferred method of treating the dead-burned magnesia refractory product is to spray the $B_2O_3$ containing solution or suspension thereon (the refractory product and the $B_2O_3$ solution both being heated as described above) with a commercial spray nozzle operated to give a good dispersion and a uniform coating of the solution over the hot refractory product.

The process of this invention is not restricted to the use of any particular type of equipment, either for heating of the refractory or for applying the boric acid containing compound to the refractory, although as noted previously, such solution or suspension is preferably sprayed onto the heated refractory. After the refractory has been treated with the solution, it is subsequently completely dried to make it suitable for use in ramming and other such special production mixes. The drying will normally be conducted in a heated dryer at a temperature of for example, 300 to 400° F., for a period of time ranging from a few minutes when the drying action is intense to approximately 30 minutes when drying conditions are mild with, about 30 minutes being the normal time.

This invention will be better understood by reference to the following specific but non-limiting examples.

EXAMPLE I

In the following example, a dead-burner magnesia refractory clinker of the following composition was used.

| | Percent |
|---|---|
| $SiO_2$ | 1.1 |
| $Fe_2O_3$ | 0.5 |
| $Al_2O_3$ | 0.5 |
| CaO | 3.4 |
| MgO | 93.9 |
| B | 0.1 |

The accumulative screen analysis of such refractory was:

| Tyler Standard Sieve— | Percent retained |
|---|---|
| ½ in. | 7 |
| ⅜ in. | 32 |
| 3 mesh | 52 |
| 6 mesh | 71 |
| 10 mesh | 86 |
| 20 mesh | 94 |

A quantity of such dead-burned refractory was obtained and cut into 10 pound sample lots. Each of these was heated at 375° F. for 2 hours, placed while still hot on a 14 in. Dravo nodulizing pan and sprayed with 250 ml. of a hot (175° F.) solution containing the weight of boron compound shown in the following Table I. The lots were treated with the indicated solution for approximately 10 minutes. The lots were thereafter dried at 375° F. for 1 hour and prepared for hydration value determinations.

In order to demonstrate the significant improvement in hydration resistance produced by the process of this invention, Lot No. 1 was not subjected to the foregoing treatment, and it can be readily seen from the table that the hydration resistance of such refractory is considerably less than those treated as described. Additionally, Lot No. 2 was given a water treatment to likewise provide a contrast in hydration resistance to illustrate the improved results of the present process. This is also shown in the following table.

In determining the hydration resistance of the samples of these examples, the following method was used. An approximately 100 gram riffled sample was prepared to −100 mesh with grinding performed in four to five stages. The ground magnesia was placed on nested 100 to 150 mesh screens and mechanically shaken for about 15 minutes until no appreciable material passed the 150 mesh screen. A 10 gram sample was then weighed into a tared, 60 mm. Petrie dish with the sample spread uniformly over the bottom of the dish and covered with exactly 2 ml. of distilled water. The dish was then covered.

The covered dish was placed on a shelf of a rack, and the rack was placed in an autoclave, the pot of which had been filled with distilled water to a depth of 1½ in. The autoclave was then sealed and heated to the full current of the Powerstat autotransformer until the pressure approached 50 p.s.i. The pressure release valve was then opened slightly for about 5 minutes to bleed the air from the autoclave. After again closing the pressure release valve, the Powerstat was adjusted to the proper setting to maintain a p.s.i.g. of 60±2 for three hours. The temperature was approximately 150° C. After digesting for 3 hours at 60 p.s.i., the power was turned off and the pressure was immediately but slowly released by cracking the pressure release valve. The autoclave was then opened and the samples removed. The dishes were uncovered and placed in a mechanical convection drying oven at 110° C. for 2 hours. The samples were then cooled and accurately weighed.

The hydration value was then calculated by subtracting the weight of the sample plus the dish before hydration from the weight of the sample and dish after hydration. This value was then multiplied by 100 and divided by the weight of the sample (the sample and dish before hydration minus the weight of the dish) to give the hydration values set forth in the following table.

TABLE 1

| | Boron treatment | | | Percent $B_2O_3$ added | Hydration values |
|---|---|---|---|---|---|
| Lot No. | Compound | Lbs. added | Percent added | | |
| 1 | None | | | 0 | 25.62 |
| 2 | Water only | | | 0 | 26.69 |
| 3 | $H_3BO_3$ | 0.05 | 0.5 | 0.28 | 8.41 |
| 4 | $H_3BO_3$ | 0.10 | 1.0 | 0.56 | 0.75 |
| 5 | $NaBO_2 \cdot 4H_2O$ | 0.05 | 0.5 | 0.13 | 17.93 |
| 2 | $NaBO_2 \cdot 4H_2O$ | 0.10 | 1.0 | 0.26 | 8.64 |
| 7 | Anhyd. Ras | 0.05 | 0.5 | 0.35 | 0.71 |
| 6 | Anhyd. Ras | 0.10 | 1.0 | 0.69 | 0.67 |

EXAMPLE II

The procedure of the foregoing example was followed, but the dead-burned magnesia refractory clinker had the following composition:

| | Percent |
|---|---|
| $SiO_2$ | 2.9 |
| $Fe_2O_3$ | 1.2 |
| $Al_2O_3$ | 0.9 |
| CaO | 3.3 |
| MgO | 91.5 |

The accumulative screen analysis was:

| Tyler Standard Sieve— | Percent retained |
|---|---|
| 3 mesh | 5 |
| 4 mesh | 33 |
| 6 mesh | 58 |
| 8 mesh | 71 |
| 10 mesh | 78 |
| 20 mesh | 83 |

The hydration values of the samples of these examples were calculated by the procedure set forth in Example I. The results are shown in the following table.

TABLE 2

| Lot No. | Boron treatment | | | Percent $B_2O_3$ added | Hydration values |
|---|---|---|---|---|---|
| | Compound | Lbs. added | Percent added | | |
| 1 | None | | | 0 | 2.06 |
| 2 | Water only | | | 0 | 3.06 |
| 3 | $H_3BO_3$ | 0.05 | 0.5 | 0.28 | 0.92 |
| 4 | $H_3BO_3$ | 0.10 | 1.0 | 0.56 | 0.49 |
| 5 | $NaBO_2 \cdot 4H_2O$ | 0.05 | 0.5 | 0.13 | 0.87 |
| 6 | $NaBO_2 \cdot 4H_2O$ | 0.10 | 1.0 | 0.26 | 0.97 |
| 7 | Anhy. borax | 0.05 | 0.5 | 0.35 | 0.47 |
| 8 | Anhy. borax | 0.10 | 1.0 | 0.69 | 0.45 |

EXAMPLE III

The procedure of the foregoing examples was also followed, but the composition of the magnesia refractory was:

|  | Percent |
|---|---|
| $SiO_2$ | 3.7 |
| $Fe_2O_3$ | 3.5 |
| $Al_2O_3$ | 0.8 |
| CaO | 12.0 |
| MgO | 80.0 |

The accumulative screen analysis of such refractory was:

| Tyler Standard Sieve— | Percent retained |
|---|---|
| 3 mesh | 2 |
| 4 mesh | 20 |
| 6 mesh | 39 |
| 8 mesh | 52 |
| 10 mesh | 63 |
| 20 mesh | 77 |

TABLE 3

| Lot No. | Boron treatment | | | Percent $B_2O_3$ added | Hydration values |
|---|---|---|---|---|---|
| | Compound | Lbs. added | Percent added | | |
| 1 | None | | | 0 | 21.92 |
| 2 | Water only | | | 0 | 18.27 |
| 3 | $H_3BO_3$ | 0.05 | 0.5 | 0.26 | 18.16 |
| 4 | $H_3BO_3$ | 0.10 | 1.0 | 0.52 | 12.22 |
| 5 | $NaBO_2 \cdot 4H_2O$ | 0.05 | 0.5 | 0.13 | 18.09 |
| 6 | $NaBO_2 \cdot 4H_2O$ | 0.10 | 1.0 | 0.26 | 16.73 |
| 7 | Anhy. ras | 0.05 | 0.5 | 0.35 | 13.91 |
| 8 | Anhy. ras | 0.10 | 1.0 | 0.69 | 1.30 |

EXAMPLE IV

In order to demonstrate the effect on hydration resistance of preheating the magnesia refractory clinker to an elevated temperature, the following comparative tests were conducted. Three samples were employed, one on which there was no treatment. A 0.5% rasorite solution was sprayed onto the second refractory clinker at room temperature, and onto the third refractory clinker heated to about 600° F., all followed by drying to remove excess water. The clinker was a dead-burned magnesia refractory clinker having essentially the composition of that employed in Example 1. The results obtained were as follows:

|  | Hydration value, percent |
|---|---|
| Hydration value without treatment | 33.7 |
| Hydration value with treatment at room temperature | 20.3 |
| Hydration value with treatment at 600° F. | 0.85 |

The tests clearly show that a surprising and significant improvement in hydration resistance was achieved by preheating the refractory clinker.

EXAMPLE V

The above work was extended in comparative tests to determine the optimum range from room temperature to 600° F. for obtaining optimum hydration resistance. Again, the samples of magnesia employed were dead-burned magnesia refractory clinker having the composition of that in Example I. The following results were obtained.

|  | Hydration value, percent |
|---|---|
| Hydration value without treatment | 35.2 |
| Hydration value with treatment at room temperature | 13.11 |
| 200° F. | 0.58 |
| 300° F. | 0.66 |
| 400° F. | 0.33 |
| 500° F. | 0.99 |
| 600° F. | 2.02 |

It is apparent from the above that optimum hydration resistance is achieved by preheating the clinker to about 400° F. Further tests confirmed that the optimum preheat temperature range for the clinker was between about 300° F. and about 400° F.

A sample of a magnesia clinker treated in accordance with this invention was evaluated to determine the extent of penetration of the boric oxide containing solution into the magnesia refractory. The treated refractory was broken with a hammer and chisel to isolate a sample of the center thereof. It was found that the center portion of the sample contained approximately 0.1% $B_2O_3$, whereas the sample prior to being broken had been treated with 0.34% $B_2O_3$.

It will be appreciated from the foregoing results that the hydration resistance of magnesia refractory products treated in accordance with the process of this invention have improved resistance to hydration. Such results are considered to be particularly surprising since the use of borates such as boric acid as a component in the formulation of magnesia refractories has been tried previously but has not been found to be effective in reducing the hydration tendencies of refractories which have a lime-to-silica ratio greater than about 1.86. When such refractories are treated as in the present invention, however, it has been found, as shown by the foregoing examples, that the hydration resistance can be significantly improved.

I, therefore, particularly point out and distinctly claim as my invention:

1. A process for making a magnesia refractory product comprising the steps of,
   preheating a dead-burned magnesia clinker to an elevated temperature;
   uniformly spraying onto said clinker a sufficient amount of an inorganic boron compound solution to add approximately 0.1 to about 1.0% by weight $B_2O_3$ to the clinker;
   subsequently drying the clinker; and
   forming the clinker into a refractory product, the clinker having a substantially improved hydration resistance.

2. The process of claim 1 wherein said magnesia clinker is preheated to a temperature more than about 300° F.

3. The process of claim 1 wherein said magnesia clinker is preheated to a temperature between about 300° F. to about 400° F.

4. The process according to claim 3 wherein the solution is heated to a temperature between about 140° F. to about 212° F., the solution having a high concentration without being cloudy.

5. The process of claim 1 wherein the amount of solution added to the preheated clinker is such as to add about 0.15% to about 0.7% by weight $B_2O_3$.

6. The process of claim 5 wherein said magnesia clinker has a lime-to-silica ratio greater than about 1.86.

7. The process of claim 1 wherein said clinker following drying is mixed with a bonding agent of the type requiring the addition of tempering water prior to placement of the refractory product in a furnace lining or mold.

8. The process of claim 1 in which the boron compound is selected from the group consisting of orthoboric acid, metaboric acid, borax, anhydrous borax, rasorite, anhydrous rasorite, sodium metaborate, colemanite, ulexite, and ammonium and potassium borates.

References Cited

UNITED STATES PATENTS

| | | | |
|---|---|---|---|
| 2,947,649 | 8/1960 | Davies | 106—58 |
| 2,999,759 | 9/1961 | Hever | 106—58 |
| 3,257,217 | 6/1966 | Van Dreser et al. | 106—58 |
| 3,279,933 | 10/1966 | Martinet | 106—58 |
| 3,360,388 | 12/1967 | Neely | 106—58 |
| 3,490,930 | 1/1970 | Martinet | 106—58 |

JAMES E. POER, Primary Examiner